United States Patent [19]

Fukawa et al.

[11] Patent Number: 5,710,792
[45] Date of Patent: Jan. 20, 1998

[54] ADAPTIVE EQUALIZER

[75] Inventors: Kazuhiko Fukawa, Yokohama; Hitoshi Yoshino; Hiroshi Suzuki, both of Yokosuka, all of Japan

[73] Assignee: NTT Mobile Communications Network, Inc., Tokyo, Japan

[21] Appl. No.: 416,858

[22] PCT Filed: Dec. 14, 1994

[86] PCT No.: PCT/JP94/02092

§ 371 Date: Apr. 17, 1995

§ 102(e) Date: Apr. 17, 1995

[87] PCT Pub. No.: WO95/17052

PCT Pub. Date: Jun. 22, 1995

[30] Foreign Application Priority Data

Dec. 15, 1993 [JP] Japan .................. 5-314670

[51] Int. Cl.$^6$ ................................. H03H 7/30
[52] U.S. Cl. ........................ 375/229; 375/232
[58] Field of Search ................. 375/229, 232, 375/341, 340, 262, 344, 354; 370/337, 350, 514; 371/41, 42, 43, 45; 340/825.14

[56] References Cited

U.S. PATENT DOCUMENTS

| | | | |
|---|---|---|---|
| 4,673,979 | 6/1987 | Kobo et al. | 375/229 |
| 5,263,033 | 11/1993 | Seshadri . | |
| 5,272,727 | 12/1993 | Okanoue | 375/341 |
| 5,285,480 | 2/1994 | Chennakeshu et al. | 375/341 |
| 5,436,928 | 7/1995 | Fukuawa et al. | 375/232 |
| 5,537,443 | 7/1996 | Yoshino et al. | 375/232 |
| 5,557,640 | 9/1996 | Chadwick | 375/229 |

FOREIGN PATENT DOCUMENTS

| 0 670 639 | 9/1995 | European Pat. Off. . |
|---|---|---|
| WO 93/06550 | 4/1993 | WIPO . |

OTHER PUBLICATIONS

Okanoue, K., et al., "An MLSE Receiver with Carrier Frequency Estimator for TDMA Digital Mobile Radio", *Proceedings of the Nordic Seminar on Digital Land Mobile Radio Communications*, Jun. 26–28, 1990, pp. 10.2.1–10.2.8.

Fines, P., and Aghvami, A.H., "A Comparison Study of Low Bit Rate DE–QPSK and TCM 8–PSK Fully Digital Demodulators over a Land Mobile Satellite Link", *IEEE Global Telecommunications Conference & Exhibition*, Dec. 2–5, 1990, pp. 401.6.1–40.6.6.

*Primary Examiner*—Stephen Chin
*Assistant Examiner*—Joseph Roundtree
*Attorney, Agent, or Firm*—Pollock, Vande Sande & Priddy

[57] ABSTRACT

A baseband signal, obtained by quasi-coherent detecting a received signal, is sampled and written as a sequence of baseband signal samples into a buffer memory. For each baseband signal sample read out from the buffer memory, a maximum likelihood sequence estimation part generates a desired symbol sequence and feeds it to a transversal filter having a characteristic based on an estimated impulse response of the transmission path in correspondence with the timing of the baseband signal sample. A phase error between an estimated received signal from the transversal filter and the corresponding baseband signal sample is sequentially detected by a phase error detecting part. The phase error thus obtained is fed to an offset correcting signal generating part, which calculates an estimated offset angular frequency $\Delta\omega_e$ on the basis of the phase error, generates an offset correcting signal of an angular frequency equal in absolute value to the estimated offset angular frequency but opposite thereto in the direction of rotation and feeds the offset correcting signal to a correcting multiplier. The correcting multiplier multiplies the baseband signal sample by the offset correcting signal to correct it to cancel an angular frequency offset, and a subtractor calculates a difference between the corrected baseband signal sample and the estimated received signal from the transversal filter.

6 Claims, 6 Drawing Sheets

FIG.1 PRIOR ART

FIG.2  PROPR ART

ADAPTIVE EQUALIZER

TECHNICAL FIELD

The present invention relates to an adaptive equalizer which suppresses transmission distortion by adaptively estimating the transfer function of the transmission path.

For example, in a conventional TDMA digital mobile communication system, multipath propagation causes intersymbol interference, which may sometimes result in a failure of accurate carrier recovery by a demodulator circuit (a coherent detector circuit, for instance) at the receiving end. To avoid this, the receiving end is conventionally provided with a local oscillator which generates a reference carrier signal instead of the recovered carrier signal and an adaptive equalizer, which performs quasi-coherent detection based on the reference carrier signal and estimates the transfer function of the transmission path for equalization, is used to suppress the degradation of the transmission performance owing to the above-mentioned intersymbol interference. As typical adaptive equalizers there are known (i) a decision feedback equalizer that feeds back a decision signal at each time instant through a transmission path characteristic simulating filter to automatically remove multipath delayed signal components and makes a signal decision at the next time instant, and (ii) a maximum likelihood sequence estimation type adaptive equalizer which generates all symbol sequence candidates in a sequential order at each time instant, generates a replica by passing each candidate through a transmission path characteristic simulating filter and estimates a symbol sequence candidate of the maximum likelihood based on an estimation error between the replica and the received signal corresponding thereto. The latter needs a larger amount of operation than does the former but is appreciably superior in terms of the error rate performance.

Figure 1:
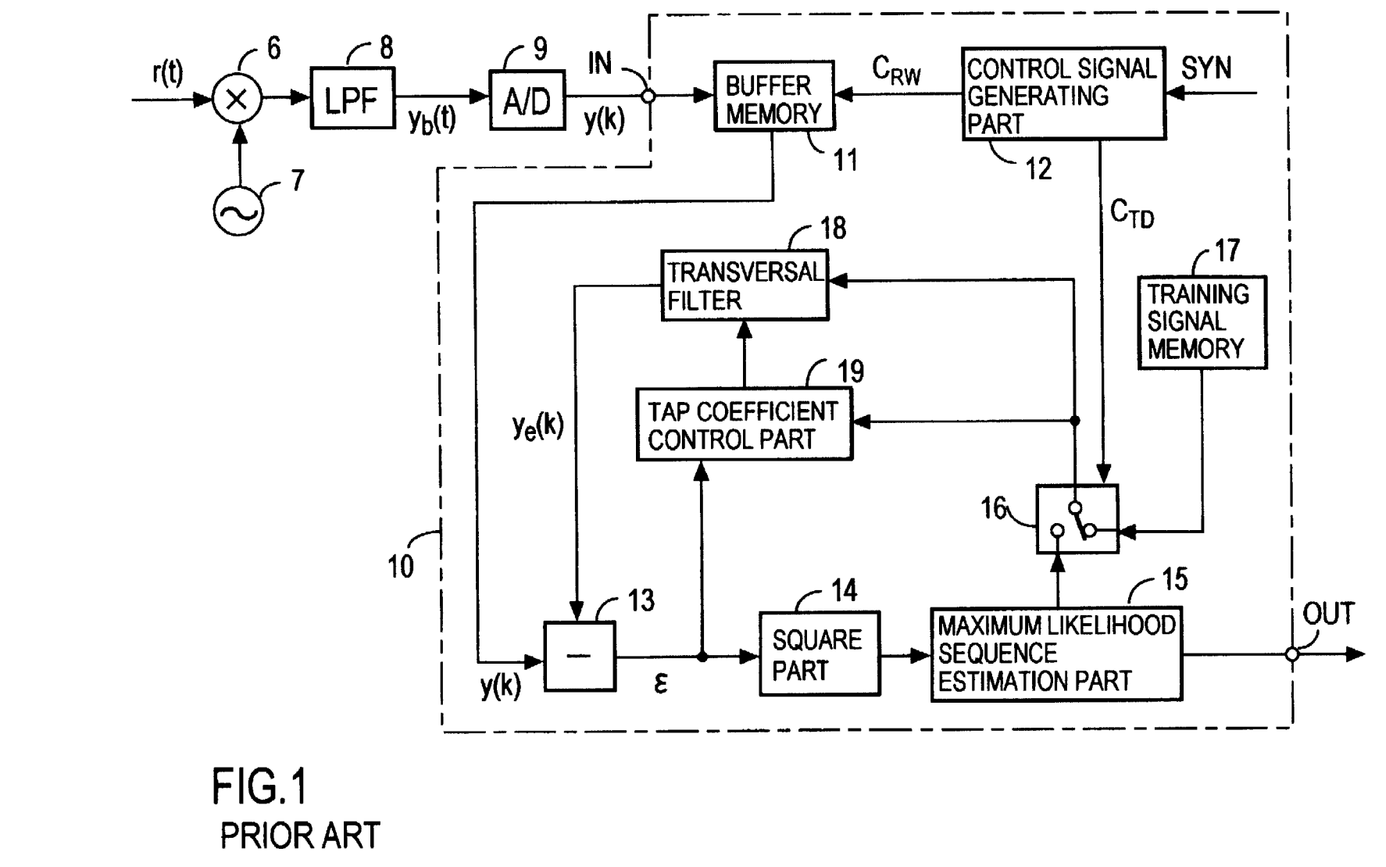
FIG. 1 is a block diagram showing an example of the configuration of a receiver with a conventional maximum likelihood sequence estimation type adaptive equalizer.

FIG. 1 is a block diagram showing the configuration of a receiver loaded with the conventional maximum likelihood sequence estimation type adaptive equalizer. In FIG. 1, a multiplier 6 is supplied at one input terminal with a burst-like received signal r(t) by the TDMA scheme and is supplied at the other input terminal with a reference carrier signal of about the same frequence $\omega_c'/2\pi$ as the carrier frequency $\omega_c/2\pi$ of the received signal output by a local oscillator 7, and multiplies them. The output from the multiplier 6 is fed to a low-pass filter (LPF) 8 to extract a baseband signal (a complex signal containing a transmission distortion) $Y_b(t)$ which is a difference frequency component. The baseband signal $Y_b(t)$ thus obtained by such quasi-coherent detection is converted by an A/D converter 9 into a digital signal y(k), which is fed to an input terminal IN of an adaptive equalizer 10.

Letting the received signal r(t) with a carrier angular frequency $\omega_c$ be expressed as the sum of its in-phase and quadrature components by the following equation:

$$r(t)=I(t)\cos\omega_c t - Q(t)\sin\omega_c t \quad (1)$$

and letting the angular frequency and phase of the reference carrier signal output by the local oscillator 7 by $\omega_c'$ and $\theta_c'$, respectively, the in-phase component of the output signal from the multiplier 6 is expressed by the following equation:

$$r(t)\cos(\omega_c' t + \theta_c') = \quad (2)$$

$$I(t)/2\{\cos[(\omega_c + \omega_c')t + \theta_c'] + \cos[(-\omega_c' + \omega_c)t - \theta_c']\} -$$

$$Q(t)/2\{\sin[(\omega_c + \omega_c')t + \theta_c'] + \sin[(-\omega_c' + \omega_c)t - \theta_c']\}$$

Letting the baseband signal $Y_b(t)$ output by the low-pass filter 8 be expressed by the sum of its in-phase and quadrature components $Re[y_b(t)]$ and $Im[y_b(t)]$, the in-phase component $Re[y_b(t)]$ becomes the difference frequency component of Eq. (2), and hence can be expressed by the following equation:

$$Re[y_b(t)]=\frac{1}{2}\{I(t)\cos(\Delta\omega_c t-\theta_c')-Q(t)\sin(\Delta\omega_c t-\theta_c')\} \quad (3)$$

where $\Delta\omega_c=\omega_c-\omega_c'$. Similarly, the quadrature component of the output signal output by the multiplier 6 is expressed by the following equation:

$$r(t)\{-\sin(\omega_c' t + \theta_c')\} = \quad (4)$$

$$-I(t)/2\{\sin[(\omega_c + \omega_c')t + \theta_c'] - \sin[(\omega_c - \omega_c')t - \theta_c']\} +$$

$$Q(t)/2\{\cos[(\omega_c - \omega_c')t - \theta_c'] - \cos[(\omega_c + \omega_c')t - \theta_c']\}$$

and the difference frequency component (the quadrature component of the baseband signal) $Im[y_b(t)]$, which is output by the low-pass filter 8, is expressed by the following equation:

$$Im[y_b(t)]=\frac{1}{2}\{I(t)\sin(\Delta\omega_c t-\theta_c')+Q(t)\cos(\Delta\omega_c t-\theta_c')\} \quad (5)$$

Letting the symbol period be represented by T, the A/D converter 9 samples and converts the received baseband signal $y_b(t)$ into digital signals y(k) at the timing t=kT (k=1, 2, 3, ... ). The output y(k) from the A/D converter 9 is expressed as the sum of its in-phase and quadrature components by the following equation:

$$y(k)=y_b(kT)=Re[y_b(kT)]+jIm[y_b(kT)] \quad (6)$$

The sampled value y(k) of the baseband signal is written into a buffer memory 11. The received digital baseband signal y(k) will hereinafter be referred to as a received baseband signal or simply as a baseband signal. Furthermore, let it be assumed, for brevity's sake, that the signal received for each burst forms one frame.

Figure 2:
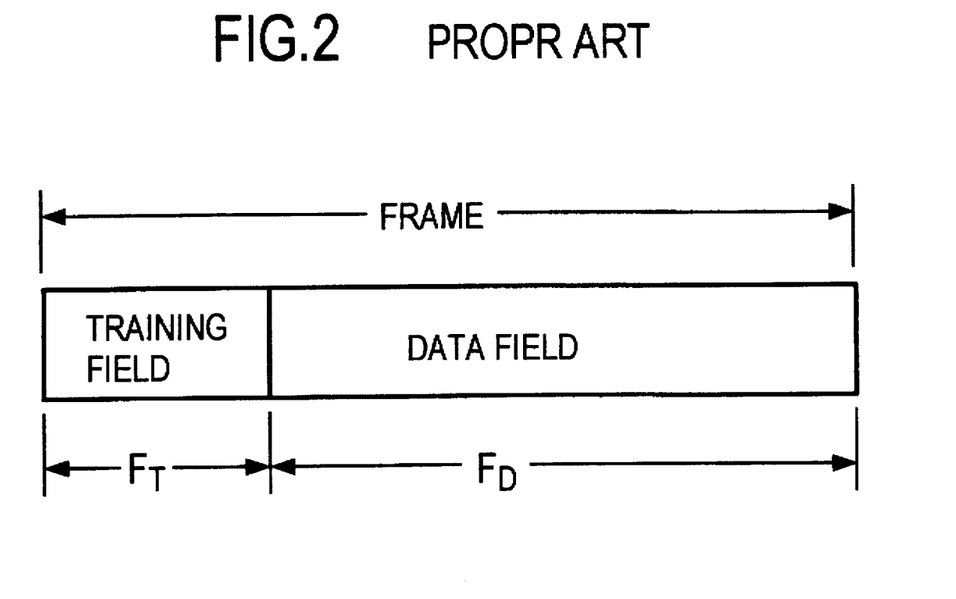
FIG. 2 is a diagram showing the frame format of signals.

Incidentally, the frame of the received signal for each burst in the TDMA digital mobile radio communication system consists, as shown in FIG. 2, of a training field $F_T$ wherein a symbol sequence corresponding to a known bit sequence, equivalent to a training signal, is arranged, and a data field $F_D$ wherein data signals subsequent to the training signal are arranged. A control signal generating part 12 is supplied with a synchronization signal SYN synchronized with the received signal frame, which is outputted by a synchronization control par not shown. In response to a read/write control signal $C_{RW}$ generated by the control signal generating part 12 in synchronization with the synchronization signal SYN, the buffer memory 11 of the adaptive equalizer writes in its predetermined areas the sampled values y(k) of the baseband signal from the A/D converter 9 one after another. The control signal generating part 12 further feeds the read/write control signal $C_{RW}$ to the buffer memory 11 at predetermined timing based on the synchronization signal SYN, reads out therefrom the sample values y(k) of the baseband signal, and feeds them to a subtractor 13.

The subtractor 13 calculates the difference between the thus read-out sampled value y(k) of the baseband signal and an estimated received signal $y_e(k)$ from a transversal filter 18, which simulates the propagation characteristic of the transmission path, and outputs an estimation error $\epsilon$. The estimation error $\epsilon$ is fed to both a tap coefficient control part 19 and a squarer 14. The squarer 14 generates the square of the absolute value of the estimation error $\epsilon$ and provides this square as likelihood information to a maximum likelihood sequence estimation part 15 which employs the Viterbi algorithm, for instance.

The maximum likelihood sequence estimation part 15 sequentially outputs complex symbol sequence candidates corresponding to all state transition candidates for state estimation. That is, the maximum likelihood sequence estimation part 15 calculates the likelihood, which is expressed, for example, by $-|\epsilon|^2$ in accordance with the likelihood information $|\epsilon|^2$ obtained corresponding to each candidate, then performs a state estimation on the basis of the Viterbi algorithm by using the likelihood to thereby make a signal decision and outputs a decision signal to a terminal OUT.

Furthermore, the control signal generating part 12 outputs a control signal $C_{TD}$ which takes a different logical value at the timing of each field of the above-mentioned frame format. A switch 16 responds to the control signal $C_{TD}$ and switches between its contacts, through which the tap coefficient control part 19 and the transversal filter 18 are connected to the output of a training signal memory 17 during the period of the training field $F_T$ of the baseband signal frame to be read out from the buffer memory 11 and to a symbol sequence candidates output of the maximum likelihood sequence estimation part 15 during the period of the data field $F_D$. Therefore, the tap coefficient control part 19 and the transversal filter 18 are supplied with the complex symbol sequence of a training signal (which is produced by modulating the above-mentioned known bit sequence in the same fashion as that at the transmitter side) from the training signal memory 17 during the period of the training field $F_T$ and the above-mentioned complex symbol sequence candidates during the period of the data field $F_D$.

Based on the complex symbol sequence of the training signal given thereto during the training field period and the estimation error $\epsilon$, the tap coefficient control part 19 adaptively estimates a tap vector coefficient $W=(w_1, w_2, \ldots, w_P)$ so that the square of the estimation error $\epsilon$ becomes minimum; thus, the tap coefficient control part 19 estimates characteristics of the transmission path and sets in the transversal filter 18 the tap coefficient vector W representing an estimated impulse response of the transmission path. The transversal filter 18 has an Ld-stage one-symbol delay corresponding to the maximum delay time (hereinafter identified by an Ld symbol time) of a delayed path which are delayed behind a direct path. Letting a complex symbol at time t=kT be represented by x(k), the state S(k) at time t=kT is a sequence of Ld selected immediately preceding complex symbols and expressed by the following equation:

$$S(k) = \{x(k-1), x(k-2), \ldots, x(k-Ld+1), x(k-Ld)\}$$

In the case of M-ary PSK scheme, each complex symbol takes any one of M values; hence, the total number of states S(k) is $M^{Ld}$. Accordingly, the number of complex symbol sequence candidates that can be used is also $M^{Ld}$.

The transversal filter 18 convolutes the complex symbol sequence candidates, which are fed by the maximum likelihood sequence estimation part 15 thereto via the switch 16 during the period of the data field $F_D$, and the above-mentioned tap coefficient vector W, in order to obtain estimated values $y_e(k)$ of transmitted symbols in a sequential order. The estimated signal $y_e(k)$ that is outputted by the transversal filter 18 will hereinafter be referred to as a replica. In mobile communication, the tap coefficient vector W needs to be updated also in the period of the data field $F_D$ because it must track fast time-varying transmission path characteristics. For this purpose, also in the period of the data field $F_D$, based upon each readout of the sampled value y(k) from the buffer memory 11, the tap coefficient vector is adaptively estimated which minimizes the square of the estimation error for each state S(k) that the transmitted signal may take (corresponding to the complex symbol sequence candidates). Then, that one of these tap coefficient vectors corresponding to the complex symbol sequence candidate for each state S(k), which is output by the maximum likelihood sequence estimation part 15, is selected and set in the transversal filter 18 for the sample y(k+1) that is read out next.

As described above, in the adaptive equalizer 10, the likelihood of each probable complex symbol sequence candidate is calculated and the calculation of the maximum likelihood sequence estimation for selecting the complex symbol sequence candidate of the maximum likelihood is conducted, for example, by employing the Viterbi algorithm; thus, the intersymbol interference is removed.

Incidentally, when the angular frequency $\omega_c$ of the received carrier signal is equal to the angular frequency $\omega_c'$ of the reference carrier signal, $\Delta\omega_c=0$; the adaptive equalizer works well. In practice, however, the carrier frequency $\omega_c/2\pi$ of the transmitter is different from the reference carrier frequency $\omega_c'/2\pi$ of the receiver owing to errors in the setting of their carrier generators, temperature variation, etc. Therefore, a carrier frequency offset component is contained in the baseband signal which is generated by quasi-coherent detection and fed into the equalizer in the receiver; possibly its magnitude becomes as large as ±1.5 kHz or so, for instance. When such a large frequency component $\Delta\omega_c$ exists, the phase of the received baseband signal rotates with time; the adaptive equalizer cannot track this variation, which causes severe degradation of its adaptivity characteristic. One method for suppressing such a carrier frequency offset component is AFC, but under the circumstances of fast fading, multipath delay distortion and burst signal transmission as in the mobile transmission, the conventional AFC scheme does not work sufficiently.

Figure 3:
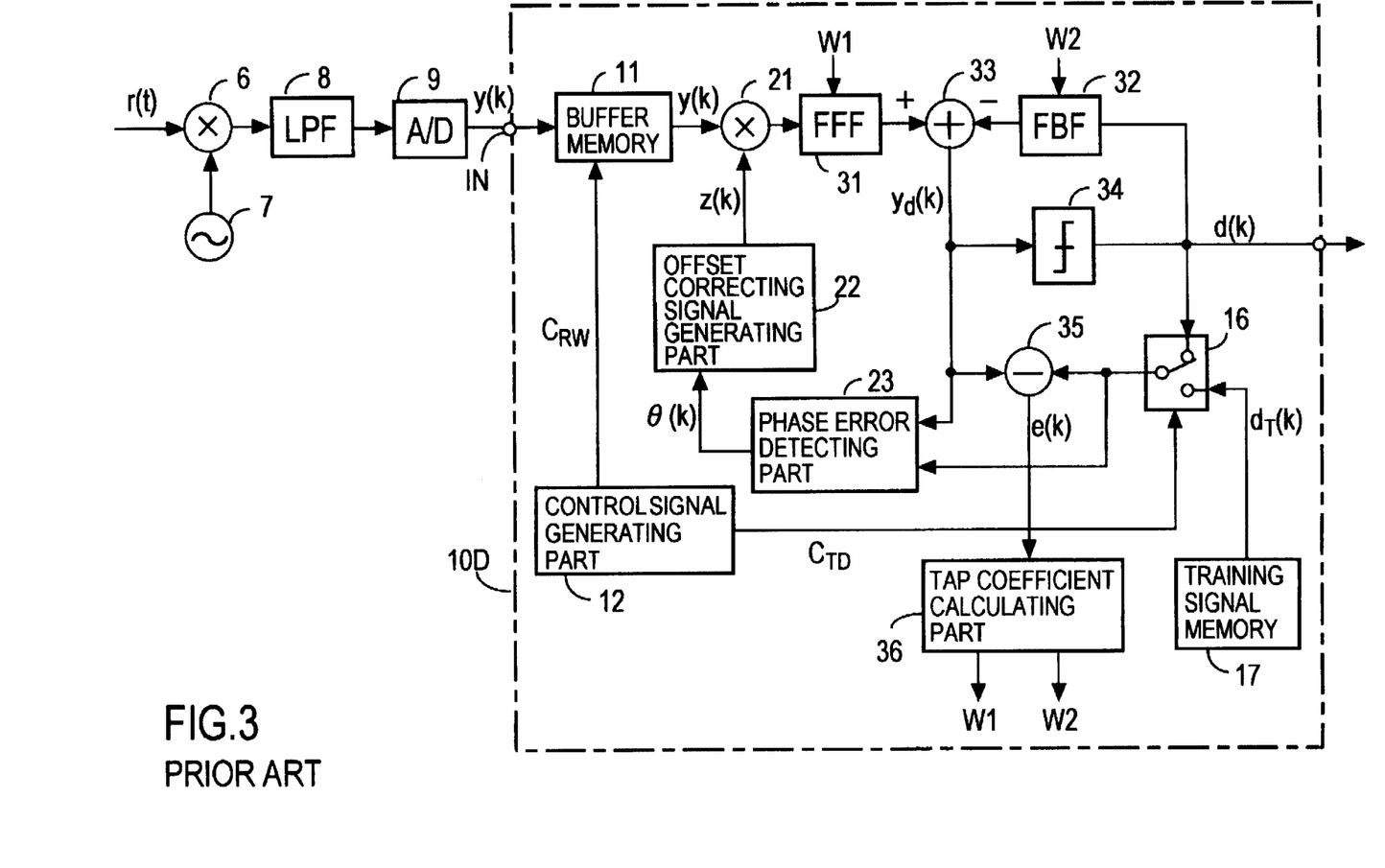
FIG. 3 is a block diagram showing a decision feedback adaptive equalizer having a conventional offset frequency correcting function.

As a solution of this problem, it is proposed, for example, by Yoshino et al., "Carrier Acquisition Training (CAT) Equalizer for Mobile radio—High Performance Carrier Frequency Offset Compensation—," the transactions of the Institute of Electronics, Information and Communication Engineers, B-II, Vol. J74-B-II, No. 9, pp.479–489, September 1991, to compensate for the carrier frequency offset in the decision feedback adaptive equalizer. The carrier offset-compensated decision feedback equalizer described in this literature has a configuration wherein: the baseband signal, which is obtained for each received burst signal, is once held in the buffer memory; the tap coefficients of the feedback filter are determined by using the training field of the baseband signal read out of the buffer memory during the quiescent period of the received signal (during the interval between burst signals); the tap coefficients thus determined are set in the feedback filter and the same training field is read out again; a phase error between the output of the equalizer which is fed to the decision device and the training signal is detected and used to estimate the carrier offset frequency; and the offset frequency is compensated for the data field signal read out of the buffer memory next. This equalizer is configured as shown in FIG. 3. This example is common to the FIG. 1 example in the arrangements wherein the received signal r(t) for each burst is multiplied in the multiplier 6 by the reference carrier from the local oscillator 7, the multiplied output is fed to the low-pass filter 8 for quasi-coherent detection and the received baseband signal y(k) of one frame, thus obtained, is written into the buffer memory 11 of the decision feedback equalizer indicated generally by 10D.

With the decision feedback equalizer 10D depicted in FIG. 3, during the period of the training field $F_T$ of the first frame read out from the buffer memory 11, an offset correcting signal generation part 22 outputs a fixed value in its initial state. A previous or past symbol decision value decided by a decision part 34 is fed via a feedback filter 32 to a subtractor 33, wherein the output of the feedback filter 32 is subtracted from the output signal of a feedforward filter 31 supplied with the baseband signal, thereby obtaining an equalized output $y_d(k)$ from which the distortion due to multipath is removed. The equalized output $y_d(k)$ is for a symbol decision fed to the decision part 34, which outputs a symbol decision value d(k). During the training period of the received signal, the switch 16 is connected to the training signal memory 17 and a subtractor 35 generates, as an error signal e(k), the difference between the training signal output by the training signal memory and the equalized output $y_d(k)$, and provides it to a coefficient calculation part 36. The coefficient calculation part 36 adaptively estimates tap coefficients W1 and W2 of the filters 31 and 32 so that the square of the error may become minimum. Next, the thus determined coefficients W1 and W2 are set in the filters 31 and 32, respectively; then, the same training field $F_T$ is read out again from the memory 11, and a phase error $\theta(k)=\arg\{y_d(k)/d_T(k)\}$ between the phase of the equalized output $y_d(k)$ obtained correspondingly and that of the training signal $d_T(k)$ from the training signal memory 17 is detected by a phase error detecting part 23 and is fed to the offset correcting signal generation part 22. As is evident from Eqs. (3) and (5), the phase angle $\Delta\omega_c t$ of the offset component rotates with constant velocity with time t; hence, the phase error $\theta(k)$ that is detected as mentioned above also rotates with constant velocity with k. That is, the value of the phase error $\theta(k)$ can be regarded as a linear function of k. Then, the offset correcting signal generation part 22 can derive, by the following equation using the least squares method, the inclination of the linear function as an offset angular frequency $\Delta\omega_e$ from the phase error $\theta(k)$ detected for each value of k=1, . . . , N (N being the number of training symbols), for instance.

$$\Delta\omega_e T = \frac{6}{N(N-1)} \left\{ \frac{2}{n+1} \sum_{K=1}^{N} K\theta(K) - \sum_{K=1}^{N} \theta(K) \right\} \quad (7)$$

Furthermore, the correcting signal generation part 22 generates an offset correcting Signal $z(k)=\exp(-j\Delta\omega_e kT)$ with an angular frequency $-\Delta\omega_e$ by using the offset angular frequency $\Delta\omega_e$ obtained as mentioned above, and provides this offset correcting signal to a correcting multiplier 21 during the period of the data field $F_D$. The baseband signal y(k) of the data field $F_D$, read out of the buffer memory 11, is multiplied by the correcting signal $z(k)=\exp(-j\Delta\omega_e kT)$ in the multiplier 21, whereby it is corrected as expressed by the following equation through use of Eq. (6); that is, the offset angular frequency $\Delta\omega_c$ component in the baseband signal y(k) is cancelled by the angular frequency $\Delta\omega_e$ contained in the correcting signal.

$$y(k)\exp(-j\Delta\omega_e Tk) = \quad (8)$$

$$Re[y(k)]\cos(\Delta\omega_e Tk) + Im[y(k)]\sin(\Delta\omega_e Tk) +$$

$$j\{-Re[y(k)]\sin(\Delta\omega_e Tk) + Im[y(k)]\cos(\Delta\omega_e Tk)\}$$

In the case of the second and subsequent received burst signals, during the period of the training field $F_T$, the tap coefficients W1 and W2 of the feedforward filter 31 and the feedback filter 32 are updated while the correcting multiplier 21 is supplied with the correcting signal with the angular frequency $\Delta\omega_e$ determined in the preceding frame, and the offset angular frequency $\Delta\omega_c$ is newly estimated in the same manner as mentioned above; this processing is repeated for each frame, by which the angular frequency $\Delta\omega_e$ of the correcting signal gradually converges to the offset angular frequency $\Delta\omega_c$.

As described above, there is described in the literature by Yoshino et al. that such a decision feedback adaptive equalizer as shown in FIG. 3 can compensate the offset frequency. However, the Yoshino et al. literature makes no reference to whether or how the frequency offset compensation scheme can be applied to the maximum likelihood sequence estimation adaptive equalizer which is superior to the decision feedback equalizer in terms of the bit error rate performance.

A purpose of the present invention is to provide a maximum likelihood sequence estimation type adaptive which is compensated for a frequency offset.

SUMMARY OF THE INVENTION

The adaptive equalizer according to the present invention for use in a receiver which receives a burst-like received signal, comprises:

buffer memory means into which a sequence of digital signals generated by sampling base band signals obtained through quasi-coherent detection of the received signal is written as a sequence of baseband signal samples and from which it is read out with predetermined timing;

control signal generating means which generates a control signal for controlling the write and read of the said buffer memory means;

maximum likelihood sequence estimating means which generates and outputs a desired symbol sequence for the baseband signal sample read out from the said buffer memory means;

transversal filter means which has a characteristic based on the estimation of the impulse response of the transmission path and is supplied with the symbol sequence in correspondence with the timing of the baseband signal sample and outputs an estimated received signal;

phase error detecting means which detects a phase error between the said estimated received signal from the said transversal filter means and the baseband signal corresponding to the said baseband signal sample;

offset correcting signal generating means which is supplied with the said phase error, calculates an estimated offset angular frequency $\Delta\omega_e$ on the basis of the said phase error and generates an offset correcting signal of an angular frequency equal in absolute value to the estimated offset angular frequency but opposite thereto in the direction of rotation;

multiplying means which multiplies the said baseband signal sample and the said offset correcting signal together to output it as a corrected baseband signal sample; and subtracting means which detects the difference between the said corrected baseband signal sample and the said estimated received signal output by the said transversal filter means and outputs it as an estimation error; and wherein the maximum likelihood sequence estimation means obtains likelihood information by using the estimation error and makes a signal decision by a maximum likelihood sequence estimation algorithm on the basis of the likelihood information.

As mentioned above, in the maximum likelihood sequence estimation adaptive equalizer according to the present invention, the phase error detecting means is so designed as to detect the phase error between the baseband signal obtained by quasi-coherent detection and the estimated received signal output by the transversal filter means which has an estimated transmission path characteristic. The thus detected phase error can be used to estimate the offset angular frequency. This makes it possible to cancel the carrier frequency offset contained in the baseband signal—as well as the offset compensation of the conventional decision feedback equalizer—and to improve the accuracy of the likelihood information necessary for the maximum likelihood sequence estimation. Hence, even if the carrier frequency offset is large, the maximum likelihood sequence estimation means can Generate stably and accurately the decision signal and the estimated signal.

BEST MODE FOR CARRYING OUT THE INVENTION

Figure 4:
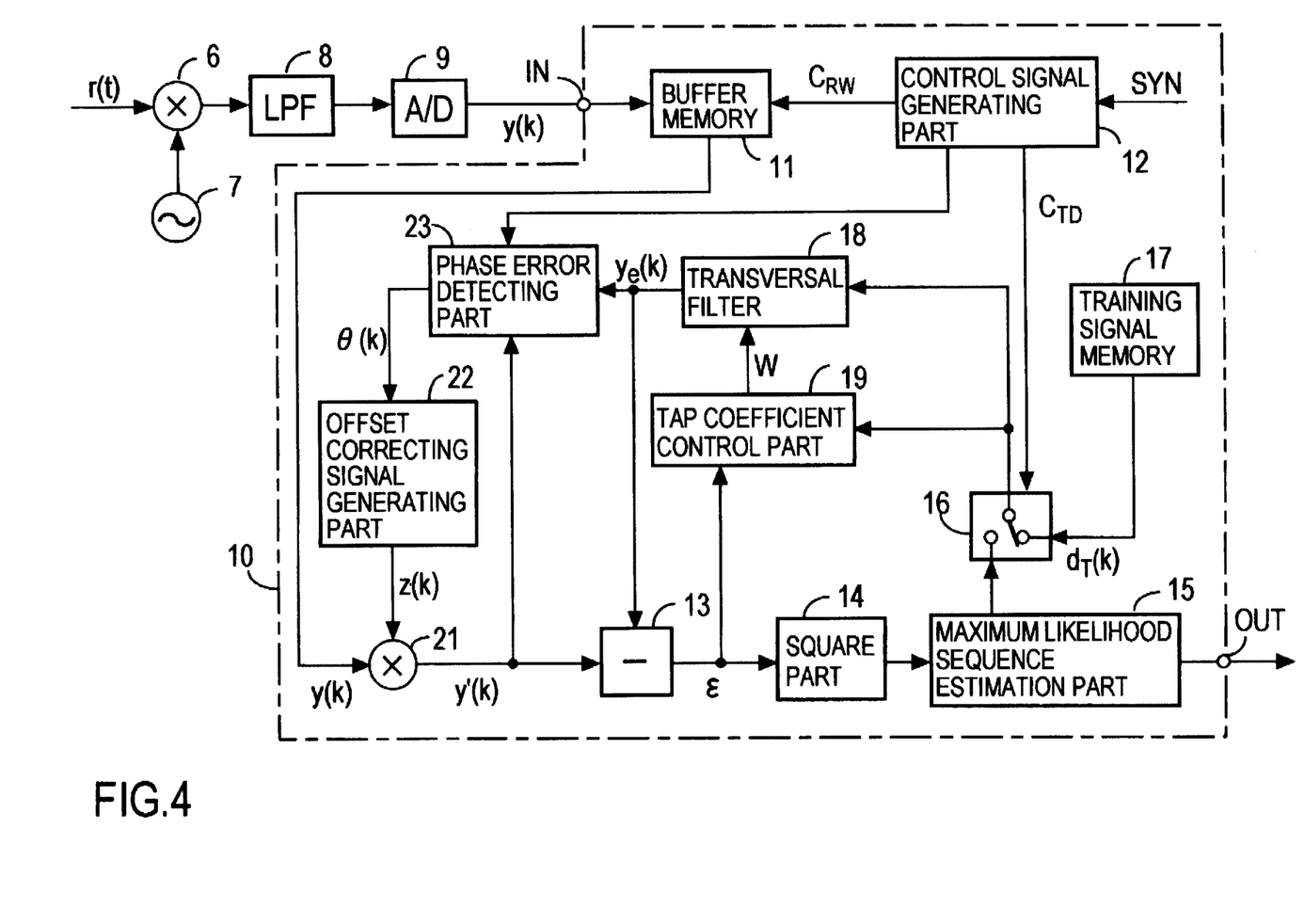
FIG. 4 is a block diagram illustrating a first embodiment of the present invention.

FIG. 4 illustrates in block form a first embodiment of the adaptive equalizer according to the present invention, together with the configuration of quasi-coherent detection. In FIG. 4, the parts corresponding to those in FIGS. 1 and 3 are denoted by the same reference numerals.

The equalizer 10 of this embodiment has, in the configuration of the conventional adaptive equalizer 10 depicted in FIG. 1, the correcting multiplier 21 which makes the offset correction by multiplying the baseband signal y(k) from the buffer memory 11 by the correcting signal, the phase error detecting part 23 which detects the phase error θ(k) between the corrected baseband signal y'(k) and the estimated received signal (the replica) $y_e(k)$ output by the transversal filter 18, and the offset correcting signal generating part 22 which estimates the off set angular frequency $\Delta\omega_c$ by using the detected phase error θ(k) and generates the offset correcting signal $z(k)=\exp\{-j\Delta\omega_c kT\}$ which has an angular frequency opposite to the calculated offset angular frequency in the direction of rotation for cancelling it, the offset correcting signal being fed to the correcting multiplier 21. The baseband signal thus subjected to the frequency offset correction is fed to the subtractor 13, followed by the same processing as FIG. 1.

The maximum likelihood sequence estimation adaptive equalizer 10 of this embodiment differs from the decision feedback adaptive equalizer 10D of the FIG. 3 example in that during the training field period the latter calculates the phase error θ(k) between the training signal and the received baseband signal y'(k) from which the multipath delay distortion is removed whereas the former calculates the phase error θ(k) between the estimated received signal (the replica) $y_e(k)$, obtained by making the training signal have the multipath delay distortion on the basis of the transmission path characteristic and the offset-corrected baseband signal.

The operation of this embodiment will hereinafter be described. The received baseband signal y(k) of each frame is written into the buffer memory 11 via the low-pass filter 8 and the A/D converter 9 from the multiplier 6 in the same manner as the FIG. 1 prior art example. The write and read of the buffer memory 11, the connection of the switch 16 and the operation timing of the tap coefficient control part 19 are controlled by the control signals $C_{RW}$ and $C_{TD}$ which are output by the control signal generating part 12.

Let it be assumed that in the initial state the offset correcting signal generating part 22 generates and outputs a predetermined fixed value (for example, "1" for brevity's sake) as the offset correcting signal z(k) to the correcting multiplier 21. Accordingly, let it be assumed that in the initial state the baseband signal y(k) read out from the buffer memory 11 is provided intact as the output y'(k) from the correcting multiplier 21. When recognizing, through recognition of the frame format of FIG. 2 with the synchronizing signal SYN used as a time reference, that-burst-like received baseband signals of one frame have all been written into the buffer memory 11, the control signal generating part 12 feeds the read/write control signal $C_{RW}$ to the buffer memory 11 to start its readout in the same manner as in the prior art example. At the same time, the control signal generating part 12 feeds the switch control signal $C_{TD}$ to the switch 16; during the period over which to read out the training field $F_T$ in the baseband signal y(k) from the buffer memory 11, the switch 16 is connected to the training signal memory 17 side, from which the symbol sequence $d_T(k)$ of the training signal is read out and fed to the transversal filter 18. The output (the estimated received signal) $y_e(k)$ of the transversal filter 18 is fed to the subtractor 13. The subtractor 13 calculates an estimation error $\epsilon=y'(k)-y_e(k)$ between the baseband signal $y'(k)=y(k)$ during the period of the training field $F_T$, fed from the buffer memory 11 via the multiplier 21, and the estimated received signal $y_e(k)$ from the transversal filter 18; the estimation error is fed to the tap coefficient control part 19. The tap coefficient control part 19 adaptively estimates the tap coefficient vector W so that the square of the absolute value of the estimation error $\epsilon$ may become minimum; the estimated tap coefficient vector is set in the transversal filter 18. The tap coefficient vector W represents an estimated impulse response of the transmission path.

After the tap coefficient vector W determined on the basis of the training field $F_T$ is thus set in the transversal filter 18, the same training field $F_T$ is read out again from the memory 11, and at the same time, the training signal $d_T(k)$ is fed again to the transversal filter 18 via the switch 16 and the phase error detecting part 23 to perform the phase error detecting operation. That is, the phase error detecting part 23 receives the signal y(k) of the training field $F_T$ as the signal y'(k) via the correcting multiplier 21 and the training signal $d_T(k)$ via the transversal filter 18 as the estimated received signal $y_e(k)$ subjected to transmission distortion; the phase error detecting part 23 detects the phase error θ(k) between the signals y'(k) and $y_e(k)$. The phase error θ(k) is calculated by the following equation.

$$\theta(k) = arg\{y'(k)/y_e(k)\} \quad (9)$$

Incidentally, assume that y'(k) and $y_e(k)$ are expressed by the complex representation which represents the in-phase component by the real part and the quadrature component by the imaginary part and that arg(x) represents the phase angle of a complex number X indicated by the polar coordinates.

As is the case with the FIG. 3 example, on the assumption that a change in the phase error θ(k), calculated for each sample number k in the training field $F_T$ period as mentioned above, is given as a linear function with respect to k, the offset correcting signal generating part 22 calculates the inclination $\Delta\omega_e T$ of the linear function by the following equation similar to Eq. (7) using the least squares method, for instance.

$$\Delta\omega_e T = \frac{6}{N(N-1)} \left\{ \frac{2}{N+1} \sum_{K=1}^{N} K\theta(K) - \sum_{K=1}^{N} \theta(K) \right\} \quad (10)$$

Moreover, since the inclination $\Delta\omega_e$ corresponds to the estimated value of the offset component $\Delta\omega_c$ of the carrier angular frequency $\omega_c$ contained in the above-mentioned baseband signal y(k) (the difference between the carrier angular frequency $\omega_c$ of the received signal and the angular frequency $\omega_c'$ of the reference carrier from the local oscillator 7), the offset correcting signal generating part 22 generates the offset correcting signal $z(k) = \exp\{-j\Delta\omega_e kT\}$ which has an angular frequency $-\Delta\omega_e$ equal in absolute value to the estimated value but opposite thereto in the direction of rotation.

Next, the switch 16 is connected to the maximum likelihood sequence estimation part 15 side and the readout of the data field from the buffer memory 11 is started; the maximum likelihood sequence estimation part 15 generates a symbol sequence candidate upon each generation of the read-out signal y(k) for each sample number k and provides it to the transversal filter 18 via the switch 16. The read-out signal y(k) from the buffer memory 11 is multiplied by the offset correcting signal z(k) in the correcting multiplier 21, which generates the signal y'(k) corrected as is the case with Eq. (8) and feeds it to the subtractor 13. The subtractor 13 calculates, as the estimation error ε, the difference between the corrected signal y'(k) and the replica $y_e(k)$ output by the transversal filter 18; the estimation error is fed to the square part 14. The square part 14 feeds, as likelihood information, the square $|\epsilon|^2$ of the absolute value of the error ε to the maximum likelihood sequence estimation part 15. The maximum likelihood sequence estimation part 15 determines the symbol sequence candidate corresponding to the state transition of the largest path metric calculated on the basis of the likelihood information by the Viterbi algorithm, for instance; then, the maximum likelihood sequence estimation part 15 decides a symbol at a time instant going back a predetermined number of symbols and outputs the decided output to the terminal OUT.

As regards each of the subsequent received frames, the tap coefficient vector W is calculated in the same manner as described above, by reading out the training field $F_T$ while maintaining the angular frequency $-\Delta\omega_e$ of the offset correcting signal z(k) determined in the immediately preceding frame and the tap coefficient vector W for the transversal filter 18 is updated with the calculated value. Furthermore, the same training field $F_T$ is read out again, then the phase error θ(k) is detected for each sample as described above and the estimated offset angular frequency $\Delta\omega_e$ is calculated by Eq. (10) on the basis of the detected phase errors and added to the previous estimated value to thereby update the angular frequency $-\Delta\omega_e$ of the offset correcting signal z(k). After the tap coefficient vector W and the angular frequency $-\Delta\omega_e$ of the correcting signal are thus updated, the data field $F_D$ is read out from the buffer memory 11 and the symbol decision is made by the maximum likelihood sequence estimation. To deal with rapid variations in the transmission characteristic, though not described in detail, the updating of the tap coefficient vector W is carried out not only during the training field period but also during the data field period as described previously with reference to FIG. 1.

While the above description has been Given of the case where the training field $F_T$ of each frame of the baseband signal y(k) is readout twice from the buffer memory, the tap coefficient vector W and the estimated offset angular frequency $\Delta\omega_e$ are determined and their previous values are updated, it is possible to converge the tap coefficient vector W and the estimated offset angular frequency $\Delta\omega_e$ with a higher degree of accuracy by updating them alternately a plurality of times for the same training field. In practice, the accuracy of their convergence could be improved appreciably by repeating the updating twice; even if the updating is repeated more times, the convergence accuracy would be little improved.

As described above, according to this embodiment, the phase error θ(k) between the baseband signal y'(k) and the replica $y_e(k)$, which is caused by the offset of the carrier frequency $\omega_c/2\pi$, is detected over the training period on the basis of the contents of the training field $F_T$ and the detected values can be used to determine the estimated offset angular frequency $\Delta\omega_e$; thus, in the adaptive equalizer utilizing the maximum likelihood sequence estimation scheme, it is possible to correct the frequency offset component and hence suppress the degradation of the transmission quality due to the offset component.

Figure 5:
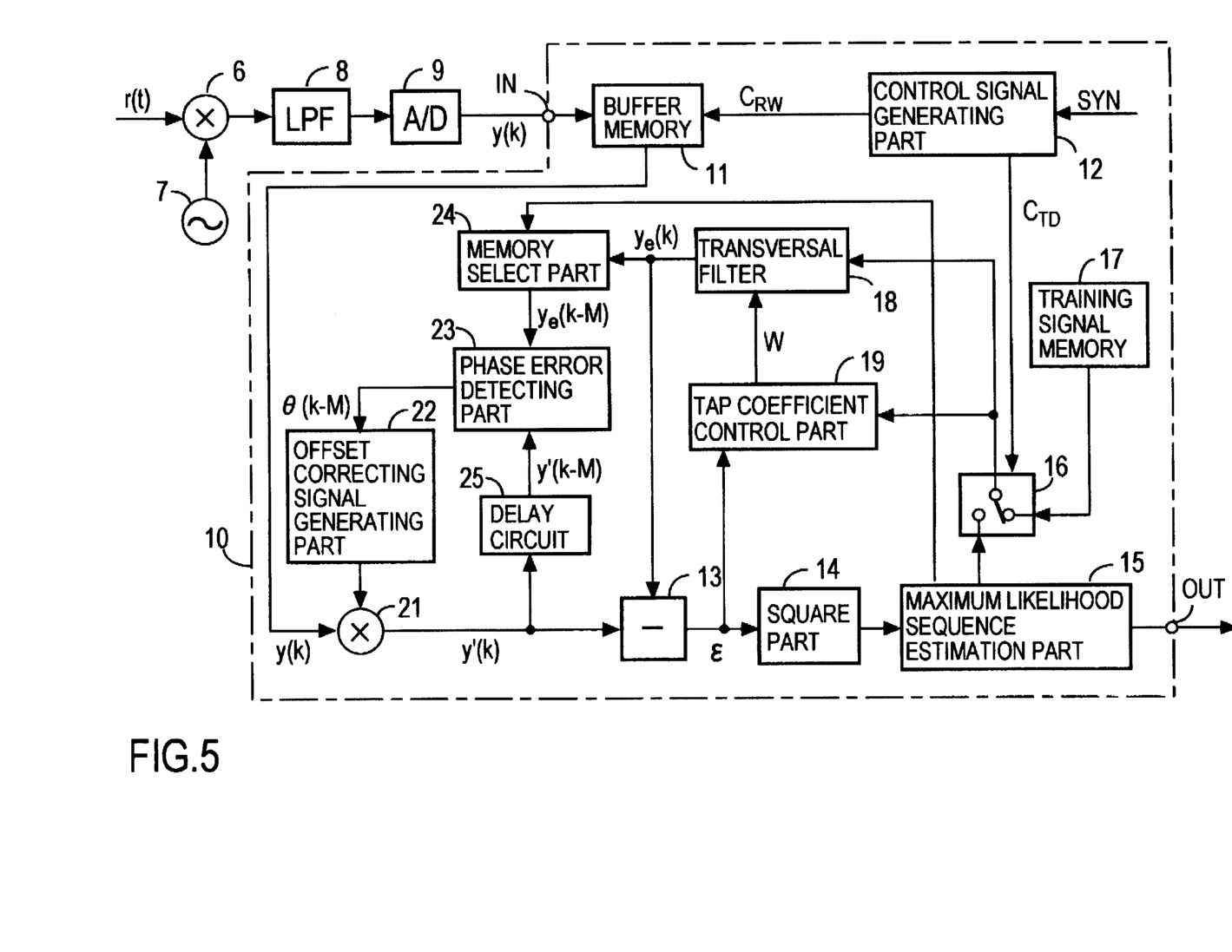
FIG. 5 is a block diagram illustrating a second embodiment of the present invention.

FIG. 5 illustrates in block form a second embodiment of the present invention. In FIG. 5, the parts which are identical in function and construction with those in FIG. 4 are identified by the same reference numerals and no description will be given of them.

The different feature of the FIG. 5 embodiment resides in the insertion of a memory select part 24 between the output of the transversal filter 18 and the one input of the phase error detecting part 23 and a delay circuit 25 between the output of the correcting multiplier 21 and the other input of the phase error detecting part 23 in the adaptive equalizer of the FIG. 4 embodiment. The operational feature of this embodiment lies in that the FIG. 4 embodiment uses the training field $F_T$ read out from the buffer memory 11 to determine the estimated offset angular frequency $\Delta\omega_e$, whereas the FIG. 5 embodiment uses the data field $F_D$ to calculate the estimated offset angular frequency $\Delta\omega_e$.

In FIG. 5, the operation at each stage from the multiplier 6 to the buffer memory 11 via the low-pass filter 8 and the A/D converter 9 is the same as in the case of FIG. 1. Also in this embodiment, the baseband signal y(k) that is obtained for each received burst signal is assumed to form one frame of the format shown in FIG. 2. Moreover, let it be assumed that in the initial state the offset correcting signal generating part 22 outputs a fixed value, and hence y(k)=y'(k) as described previously.

The control signal generating part 12 recognizes the frame format of FIG. 2, using the synchronization signal as a time reference and when samples values of the baseband signal over one frame period are written into the buffer memory 11, the control signal generating circuit controls the switch 16 to connect it to the training signal memory 17 side as well as the conventional one in FIG. 1. The training signal $d_T(k)$ is fed by the training signal memory 17 to the transversal filter 18, while at the same time baseband signal samples y(k) of the training field $F_T$ are sequentially read out from the buffer memory 11 and, as described previously in FIG. 1, the tap coefficient vector W of the transversal filter 18 is determined in the tap coefficient control part 19. The tap coefficient vector W thus determined is set in the transversal filter 18, then the switch 16 is connected to the maximum likelihood sequence estimation part 15 side, followed by starting the readout of the data field $F_D$ from the buffer memory 11.

As is well-known in the art, upon each readout of the sample value y(k) of the data field $F_D$ from the buffer memory 11, the maximum likelihood sequence estimation part 15 provides all symbol sequence candidates one after another to the transversal filter 18 via the switch 16; the square of the absolute value of the estimation error between the baseband signal (which is the output from the correcting multiplier 21, however) y'(k) and the replica $y_e(k)$, when each complex symbol sequence candidate is fed to the transversal filter 18, is obtained as likelihood information by the subtractor 13 and the square part 14. At the same time, the replica $y_e(k)$ at the time of the symbol sequence candidate having been fed to the transversal filter 18 is stored in the memory select part 24 in correspondence with that candidate. For example, in the case of employing the Viterbi algorithm, the maximum likelihood sequence estimation part 15 calculates, on the basis of the likelihood information obtained for every complex symbol sequence candidate, branch metrics of all branches through which each state S(k), which the received signal is allowed to take at the current time instant, is reached; one path that has the maximum path metric is left for each state, and the path to each state and its path metric are stored in an internal memory not shown. In this instance, the path is assumed to be stored up to a time instant a predetermined truncate length L before. The symbol decided at a time instant L symbols before is fed to the terminal OUT as the result of decision of the symbol corresponding to the symbol sequence candidate which has the maximum path metrix at the current time.

Letting a predetermined integer larger than 1 but smaller than L be represented by M, the maximum likelihood sequence estimation part 15 further supplies the memory select part 24 with information indicating the symbol sequence candidate which has the maximum path metric at the current time (which information will hereinafter be referred to as quasi-decision information). The memory select part 24 reads out the replica $y_e(k-M)$ stored corresponding to the symbol sequence candidate represented by the quasi-decision information and feeds it to the phase error detecting part 23. On the other hand, the delay of the delay circuit 25 is set to be M symbols; hence, the delay circuit outputs and feeds y'(k−M) to the phase error detecting part 23. The phase error detecting part 23 detects the phase error $\theta(k-M)=\arg\{y'(k-M)/y_e(k-M)\}$ between the replica $y_e(k-M)$ and the baseband signal sample y'(k−M) at time M symbols before and feeds the detected phase error to the offset correcting signal generating part 22. Letting the estimated offset angular frequency at the current sample point k be represented by $\Delta\omega_e(k)$ and the estimated offset angular frequency at a sample point (k−1) one sample point before be represented by $\Delta\omega_e(k-1)$, the offset correcting signal generating part 22 calculates the estimated offset angular frequency $\Delta\omega_e(k)$ sequentially for each sample number k by the following equation:

$$\Delta\omega_e(k)=\Delta\omega_2(k-1)-\mu\theta(k-M)/T \quad (11)$$

By repeating the sequential calculation by Eq. (11), the estimated offset angular frequency $\Delta\omega_e(k)$ converges to $\Delta\omega_c$. In the above, μ is a predetermined positive step size; when the step size μ is selected large, the convergence becomes fast but is likely to be degraded by noise.

Based on the estimated offset angular frequency $\Delta\omega_e(k)$ sequentially obtained as mentioned above, the offset correcting signal generating part 22 sequentially generates the offset correcting signal $z(k)=\exp\{-J\Delta\omega_e(k)Tk\}$ of the angular frequency $-\Delta\omega_e(k)$ which is equal in absolute value to the estimated value but opposite thereto in the direction of rotation, while at the same time updating the signal sequentially.

The multiplier 21 multiplies the baseband signal y(k) from the buffer memory 11 by the offset correcting signal z(k), by which a correction is made to shift the offset angular frequency component $\Delta\omega_c$ contained in the baseband signal y(k) to $(\Delta\omega_c-\Delta\omega_e)$. As the estimated offset angular frequency $\Delta\omega_e$ converges to $\Delta\omega_c$, the offset diminishes. Hence, degradation of the transmission quality by the frequency offset is suppressed.

While this embodiment calculates the estimated value of the offset component of the carrier frequency by employing the LMS algorithm, the present invention is not subject specifically to such an algorithm; for example, as is the case with the FIG. 4 embodiment, it is also possible to detect the phase error θ(k−M) for a sequence of samples y(k), k=i, i+1, . . . , i+K−1, of a predetermined section of the data field $F_D$ and calculate the estimated offset angular frequency $\Delta\omega_e$ by using Eq. (10). The value K is an integer equal to or smaller than the number of symbols (the number of samples) of the data field $F_D$ and equal to or greater than 2. When K is equal to or greater than ½ of the number of samples of the data field, the estimated offset angular frequency $\Delta\omega_e$ may also be updated a plurality of times by the least squares method of Eq. (10). Also in this embodiment, provision may be made for sequentially updating the tap coefficient vector through use of the data field $F_D$. Furthermore, also in this embodiment, provision may be made for updating the tap coefficient vector during the data field period.

Figure 6:
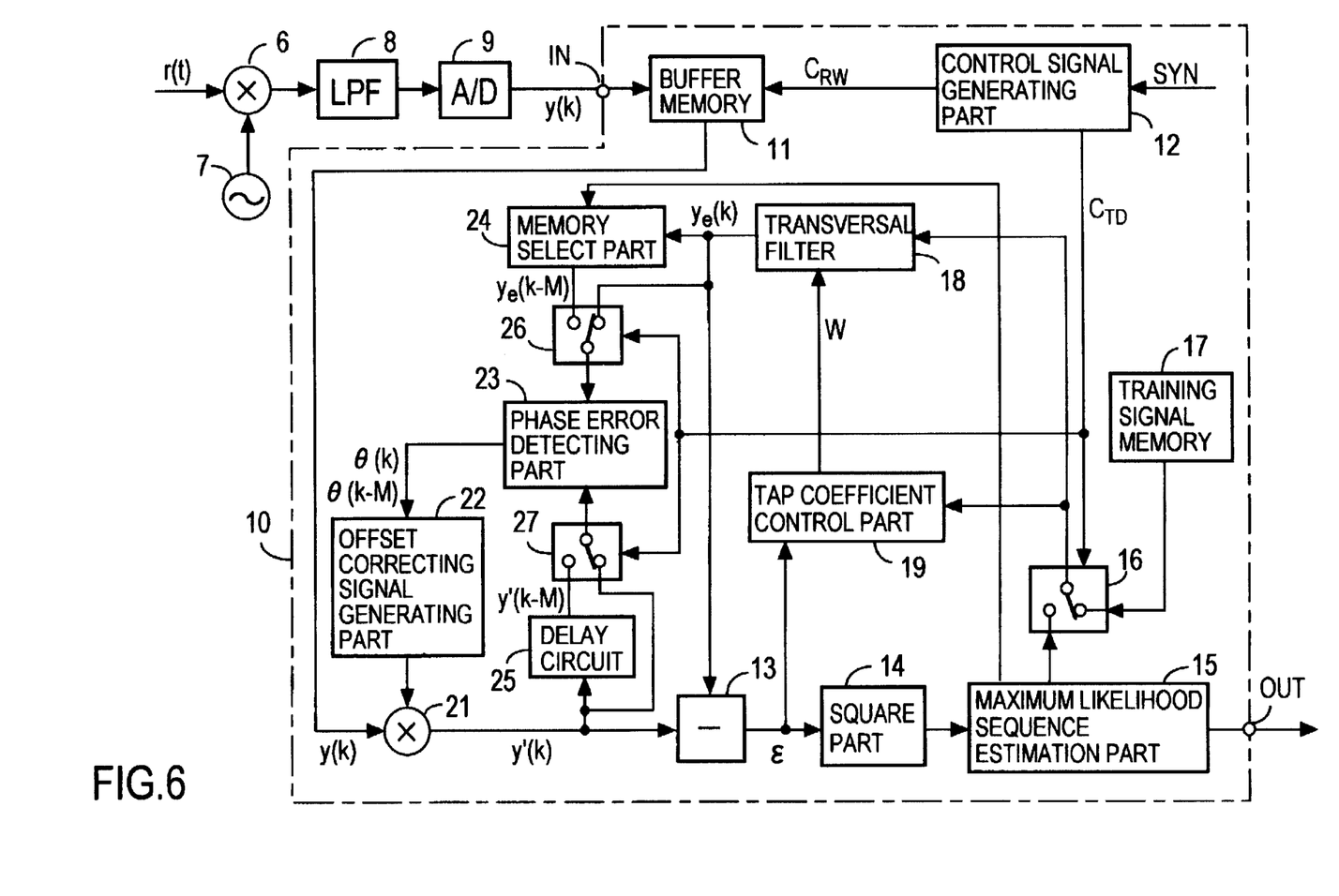
FIG. 6 is a block diagram illustrating a third embodiment of the present invention.

FIG. 6 illustrates in block form a third embodiment of the adaptive equalizer according to the present invention, which is designed to carry out both detection of the estimated offset angular frequency $\Delta\omega_e$ through utilization of the training field $F_T$ by the FIG. 4 embodiment and detection of the estimated offset angular frequency $\Delta\omega_e$ through utilization of the data field $F_D$ by the FIG. 5 embodiment. The parts corresponding to those in FIGS. 4 and 5 are identified by the same reference numerals. The FIG. 6 embodiment has a configuration wherein, in the FIG. 5 embodiment, a switch 26 is inserted between the memory select part 24 and the phase error detecting part 23 to feed a selected one of the output from the transversal filter 18 and the output from the memory select part 24 to one input of the phase error detecting part 23. Furthermore, a switch 27 is inserted between the output of the delay circuit 25 and the other input of the error phase detecting part 23 to feed a selected one of the output from the correcting multiplier 21 and the output from the delay circuit 25 to the phase error detecting part 23.

Under the control of the control signal generating part 12, the switch 16 is connected to the training signal memory 17 side, the switch 26 is connected to the transversal filter 18 side and the switch 27 is connected to the correcting multiplier 21 side. As in the FIG. 4 embodiment, the training field $F_T$ is read out first from the buffer memory 11, then the training signal $d_T(k)$ is read out from the training signal memory 17 and the tap coefficient vector W is determined accordingly. The thus determined tap coefficient vector W is set in the transversal filter 18, then the training field $F_T$ is read out again from the buffer memory 11, and at the same time the training signal is read out from the training signal memory 17, whereby the estimated offset angular frequency $\Delta\omega_e$ is detected accordingly. On the basis of the thus detected estimated offset angular frequency $\Delta\omega_e$, the offset correcting signal $z(k) = \exp\{-j\Delta\omega_e Tk\}$ is fed to the correcting multiplier 21.

Next, the switch 16 is connected to the maximum likelihood sequence estimation part 15 side, the switch 26 is connected to the memory select part 24 side and the switch 27 is connected to the delay circuit 25 side. Then, upon each readout of the sample y(k) of the data field $F_D$ from the buffer memory 11, the maximum likelihood sequence estimation part 15 makes a symbol decision for the sample y'(k) outputted from the correcting multiplier 21 by the maximum likelihood sequence estimation algorithm as in the FIG. 5 embodiment. At the same time, information indicating the complex symbol sequence candidate which has the maximum path metric at the current time is fed to the memory select part 24 and the corresponding replica $y_e(k-M)$ M symbols before is read out therefrom and input into the phase error detecting part 23, wherein the phase error $\theta(k-M)$ between it and the corrected sample y'(k-M) M symbols before is detected. The offset correcting signal generating part 22 calculates the estimated offset angular frequency $\Delta\omega_e$ on the basis of the phase error and feeds the corresponding offset correcting signal z(k) to the correcting multiplier 21. As in the embodiments of FIGS. 4 and 5, the tap coefficient vector W can also be updated during the period of the data field $F_D$.

While the embodiments have been described in connection with the case where the signal decision processing is performed on the basis of the Viterbi algorithm, the present invention is not subject specifically to such an algorithm; as long as equivalent signal decision processing is surely carried out at a desired speed, any maximum likelihood sequence estimation algorithms can be employed.

In the above-described embodiments the received signal is directly frequency converted into the baseband region on the basis of the reference carrier signal generated by the local oscillator 7; however, the present invention is not subject specifically to such a configuration and is also applicable, for example, to a receiver of the type that detects the received signal after converting it into an intermediate-frequency signal of a desired frequency.

Besides, although the above-described embodiments each utilize the least squares method of LMS algorithm to calculate the offset component $\Delta\omega_e$ in the offset correcting signal generating part 22 on the basis of the phase error $\theta(k)$ or $\theta(k-M)$ calculated by the phase error detecting part 23, the present invention is not subject specifically to such calculation methods; any calculation methods can be applied as long as the calculation is surely conducted with a desired speed and with desired accuracy on the basis of variations of the phase difference with time.

As described above, according to the present invention, the estimated offset angular frequency $\Delta\omega_e$ can be calculated by detecting the phase error between the estimated received signal (the replica) and the corrected baseband signal sample in the phase error detecting part 23; consequently, the offset frequency component in the baseband signal can be suppressed. Hence, the estimation error in the subtractor 13 can be calculated with high accuracy and the maximum likelihood sequence estimation part 15 performs the signal decision processing on the basis of the likelihood information corresponding to the estimation error—this can make the decision signal and the estimated signal, stable and accurate even when the offset frequency $\Delta\omega_e/2\pi$ is large.

Thus, at the receiving end of the digital communication system employing the present invention, the degradation of the transmission quality due to transmission distortion is suppressed and the acceptable limits for errors and fluctuations of the reference carrier frequency which is locally generated at the receiving end for the frequency conversion or demodulation of the received signal are expanded.

Having thus described our invention, we claim:

1. An adaptive equalizer for use in a receiver which receives a burst-like received signal, comprising:

buffer memory means into which a sequence of samples of digital signals obtained by sampling a baseband signal obtained through quasi-coherent detection of said received signal is written as a sequence of baseband signal samples and from which the sequence of baseband signal samples is read out with predetermined timing;

control signal generating means which generates a control signal for controlling the write and read of said buffer memory means;

maximum likelihood sequence estimation means which generates and outputs a desired symbol sequence for said baseband signal samples read out from said buffer memory means;

transversal filter means which has a characteristic based on the estimation of the impulse response of a transmission path and is supplied with said symbol sequence in correspondence with the timing of said baseband signal sample and outputs an estimated received signal;

phase error detecting means which detects a phase error between said estimated received signal from said transversal filter means and the baseband signal corresponding to said baseband signal sample;

offset correcting signal generating means which is supplied with said phase error, calculates an estimated offset angular frequency $\Delta\omega_e$ on the basis of said phase error and generates an offset correcting signal of an angular frequency equal in absolute value to said estimated offset angular frequency but opposite thereto in the direction of rotation;

multiplying means which multiplies said baseband signal sample and said offset correcting signal to generate a corrected baseband signal sample; and subtracting means which calculates the difference between said corrected baseband signal sample and said estimated received signal from said transversal filter means and outputs it as an estimation error;

wherein said maximum likelihood sequence estimation means obtains likelihood information from said estimation error and makes a signal decision by a maximum likelihood sequence estimation algorithm on the basis of said likelihood information.

2. The adaptive equalizer of claim 1, wherein said quasi-coherent detection baseband signal has a frame configuration composed of a training field and a data field;

wherein said maximum likelihood sequence estimation means comprises: training signal memory means which has stored therein a training signal of a predetermined symbol sequence; a maximum likelihood sequence estimation part which generates and outputs all symbol sequence candidates in a sequential order upon each readout of said baseband signal samples from said buffer memory means during the period of said data field, obtains likelihood information from said estimation error outputted by said subtracting means in correspondence with each of said symbol sequence candidates and makes a signal decision on the basis of said likelihood information; and switching means which outputs a selected training signal from said training signal memory means and each symbol sequence candidate from said maximum likelihood sequence estimation part to said transversal filter means;

wherein said transversal filter means comprises: a tap coefficient control part which adaptively estimates said impulse response of said transmission path on the basis of said estimation error and outputs an estimated impulse response as a tap coefficient vector; and a transversal filter which is supplied with said tap coefficient vector and convolutes the tap coefficient vector with said symbol sequence candidate inputted thereinto and outputs the convoluted output as said estimated received signal; and wherein said control signal generating means outputs a signal which controls said switching means to feed said training signal from said training signal memory means to said transversal filter means during the period of said training field and said symbol sequence candidates from said maximum likelihood sequence estimation part to said transversal filter means during the period of said data field.

3. The adaptive equalizer of claim 2, wherein: said control signal generating means controls said buffer memory means to read out therefrom said training field at least twice; said tap coefficient control part determines said tap coefficient vector on the basis of said estimation error which is obtained in the first training field readout period and sets said tap coefficient vector in said transversal filter; said phase error detecting means detects the phase error between said estimated received signal which is obtained in the second training field readout period and said baseband signal; and said offset signal generating means generates said offset correcting signal on the basis of said phase error provided in said second training field readout period and feeds the offset correcting signal to said multiplying means.

4. the adaptive equalizer of claim 2, wherein said maximum likelihood sequence estimation part supplies said phase error detecting means with information indicating a symbol sequence candidate which has the maximum likelihood at the current time; and wherein said phase error detecting means comprises: a memory select part which stores said estimated received signal, which is fed by said transversal filter for each of said symbol sequence candidates during the period of said data field, in correspondence with said each symbol sequence candidate and responds to said symbol sequence candidate information from said maximum likelihood sequence estimation part to read out the corresponding estimated received signal a predetermined number of symbols before; a delay circuit which delays said baseband signal from said multiplying means by said predetermined number of symbols; and a phase error detecting part which detects, as said phase error, a phase difference between said estimated received signal said predetermined number of symbols before outputted by said memory select part and said delayed received baseband signal from said delay circuit and feeds the detected phase difference to said offset correcting signal generating means.

5. The adaptive equalizer of claim 3, wherein said maximum likelihood sequence estimation part supplies said phase error detecting means with information indicating a symbol sequence candidate which has the maximum likelihood at the current time;

wherein said phase error detecting means comprises:

a memory select part which stores said estimated received signal, which is outputted by said transversal filter for each of said symbol sequence candidates during the period of said data field, in correspondence with said each symbol sequence candidate and responds to said symbol sequence candidate information from said maximum likelihood sequence estimation part to read out the corresponding estimated received signal a predetermined number of symbols before;

a delay circuit which delays said baseband signal from said multiplying means by said predetermined number of symbols;

a phase error detecting part which has first and second inputs, detects as said phase error a phase difference between said estimated received signal fed to said first input and said baseband signal fed to said second input and feeds the detected phase difference to said offset correcting signal generating means;

a first switch which feeds a selected one of the current estimated received signal from said transversal filter and said estimated received signal said predetermined number of symbols before from said memory select part to said first input of said phase error detecting part; and a second switch which feeds a selected one of the current baseband signal from said multiplying means and said baseband signal said predetermined number of symbols before from said delay circuit to said second input of said phase error detecting part; and wherein said control signal generating part controls said first switch to select the output of said transversal filter and said second switch to select the output of said multiplying means during the readout of said training field from said buffer memory means and controls said first switch to select the output of said memory select part and said second switch to select the output of said delay circuit during the readout of said data field from said buffer memory means.

6. The adaptive equalizer of claim 2, 3, or 4, wherein said maximum likelihood sequence estimation part estimates a maximum likelihood sequence by employing the Viterbi algorithm.

* * * * *